United States Patent
Schmidt

(10) Patent No.: US 12,017,935 B2
(45) Date of Patent: Jun. 25, 2024

(54) WATER SALINIZER

(71) Applicant: Robert Schmidt, Carrollton, VA (US)

(72) Inventor: Robert Schmidt, Carrollton, VA (US)

(73) Assignee: Robert Schmidt, Carrollton, VA (US)

( * ) Notice: Subject to any disclaimer, the term of this patent is extended or adjusted under 35 U.S.C. 154(b) by 0 days.

(21) Appl. No.: 17/374,493

(22) Filed: Jul. 13, 2021

(65) Prior Publication Data

US 2023/0016197 A1    Jan. 19, 2023

(51) Int. Cl.
*C02F 1/68* (2023.01)

(52) U.S. Cl.
CPC ........ *C02F 1/688* (2013.01); *C02F 2301/026* (2013.01); *C02F 2305/00* (2013.01)

(58) Field of Classification Search
CPC .. C02F 1/688; C02F 1/687; C02F 1/68; C02F 2301/00; C02F 2301/02; C02F 2301/026; C02F 2305/00; C02F 1/78; B01F 21/20; B01F 21/22; B01F 3/04; B01F 15/04; B01F 23/02; B01F 23/021; B01F 23/022; B01F 23/023; B01F 23/024; B65D 47/04; B65D 47/06; B65D 47/065; B65D 88/54; B65D 88/74; B67D 3/0012; B67D 3/0016; B67D 3/0025; B67D 3/0061; B67D 3/0067; B67D 2210/00031; B67D 2210/00028; B67D 2210/00146; E04H 4/00; E04H 4/12; E04H 4/1209; E04H 4/1281
See application file for complete search history.

(56) References Cited

U.S. PATENT DOCUMENTS

| | | | | |
|---|---|---|---|---|
| 5,736,034 A * | 4/1998 | Phillips | ............... | B03D 1/247 210/512.1 |
| 6,303,028 B1 * | 10/2001 | Marks | ............... | B01D 19/02 119/264 |
| 6,464,210 B1 * | 10/2002 | Teran | ............... | B01F 33/821 366/173.2 |
| 6,808,625 B1 * | 10/2004 | Wu | ............... | A01K 63/04 119/264 |
| 7,445,706 B2 * | 11/2008 | Liu | ............... | A01K 63/045 210/167.26 |
| 7,651,610 B2 * | 1/2010 | Tsai | ............... | A01K 63/045 210/221.1 |
| 8,268,166 B2 * | 9/2012 | Marks | ............... | A01K 63/04 210/167.25 |
| 11,000,874 B2 * | 5/2021 | McPeek | ............... | B05B 17/08 |

OTHER PUBLICATIONS

Rain Wizard 65 Gallon Rain Barrel; Good Ideas Inc. (10 pages). (Year: 2020).*
WayBackMachine, Internet Archive (web.archive.org) (1 page) for Rain Wizard 65 Gallon Rain Barrel; Good Ideas Inc. (Year: 2020).*

* cited by examiner

Primary Examiner — Bradley R Spies
(74) Attorney, Agent, or Firm — 8XUM IP LLC; Trent V. Bolar

(57) ABSTRACT

An article of manufacture for providing a water salinizer to add salt to pool water is disclosed. The water salinizer includes a barrel having a sidewall, a convex bottom, an angled sidewall between the convex bottom and the side wall, and an opening is a top surface for dissolving material into water, an input port coupled to the angled sidewall and being configured with the convex bottom to direct an incoming pressurized water stream and salt around the barrel along the angled sidewall, and a discharge port coupled to the sidewall about the opening in the top surface on an opposite side of the barrel from the input port.

7 Claims, 19 Drawing Sheets

WATER SALINIZER

TECHNICAL FIELD

This application relates in general to an article of manufacture for providing water treatment, and more specifically, to an article of manufacture providing a water salinizer to add salt to pool water.

BACKGROUND

The water treatment business, both in private systems as well as municipal systems, produce upwards of 80 million gallons of water a day at a single facility. Upwards of a dozen chemicals in granular and powder form are necessary to be added to water for producing good drinking water. The same may be said for swimming pools. The municipal systems have huge mixing tanks where multiple products are mechanically mixed for ease in release after dissolving into water being treated. In contrast, a homeowner of a swimming pool does not have access to a mixing tank option. Currently, these homeowners must manually mix all their granular and powder products by hand and dissolve them in the pool water.

All pool owners must either hand stir the products in a bucket to dissolve and then poor into the pool. When it comes to salt, you have 2 options. First, a homeowner may dump a 40-pound bag of salt into their pool and step on the salt for 2 or more days until it slowly dissolves. Alternatively, the homeowner may dump the same 40 lb. bag of salt into the pool and take a scrub brush for 20 to 30 minutes of hard manual labor to scrub the salt against the pool floor to assist the salt to dissolve in a timely manner. The homeowner may need to dissolve 2 or more 40 lb. bags of salt each week or more depending on your chemistry testing of the pool water which determines how much salt is needed per application.

Therefore, a need exists for an article of manufacture for providing a water salinizer to add salt to pool water without need for a significant amount of effort. The present invention attempts to address the limitations and deficiencies in prior solutions according to the principles and example embodiments disclosed herein.

SUMMARY

In accordance with the present invention, the above and other problems are solved by providing an article of manufacture for a water salinizer to add salt to pool water according to the principles and example embodiments disclosed herein.

In one embodiment, the present invention is an article of manufacture for providing a water salinizer to add salt to pool water. The water salinizer includes a barrel having a sidewall, a convex bottom, an angled sidewall between the convex bottom and the side wall, designed to direct the granular salt into path of water flow, and an opening is a top surface for dissolving material into water, an input port coupled to the angled sidewall and being configured to direct an incoming pressurized water stream around the convex bottom of the barrel and along the angled sidewall, and a discharge port coupled to the sidewall about the opening in the top surface on an opposite side of the barrel from the input port.

In another aspect of the present invention, the input port comprises intake directional port having a female hose fitting in an end extending to a location outside of the barrel, a curved top surface located within the barrel, a directional output is positioned about the middle of the top surface, and a channel connecting the female hose fitting to the directional output.

In another aspect of the present invention, the discharge port comprises a wall-mating surface, a threaded hose connection on an output side of a wall-mating surface, an inner barrel port on the barrel side of the wall-mating surface, and a discharge channel connecting the inner barrel port to the threaded hose connection.

In another aspect of the present invention, the barrel is an 8-gallon barrel capable of containing 40 pounds of salt granules to be dissolved when pressurize water enters the barrel through the input port with the dissolved salt and water exiting the barrel through the discharge port.

In another aspect of the present invention, the barrel is further configured to generate a centrifugal flow pattern as the pressurized water flows from the input port and out of the discharge port.

In another embodiment, the present invention is a method of salinizing water in a barrel. The barrel has a sidewall, a convex bottom, an angled sidewall between the convex bottom and the side wall, designed to help direct granular salt into path of water flow, and an opening is a top surface for dissolving material into water, an input port coupled to the angled sidewall and being configured to direct an incoming pressurized water stream around the convex bottom of the barrel along the angled sidewall, and a discharge port coupled to the sidewall about the opening in the top surface on an opposite side of the barrel from the input port. The method adds granular salt into the barrel, connects an input water hose to the pressurized water inlet, connects a drainage hose to the discharge port, introduces fresh water into the barrel through the pressurized water inlet, and directs salinized water outflowing from the discharge port once the barrel has filled with water.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1A:
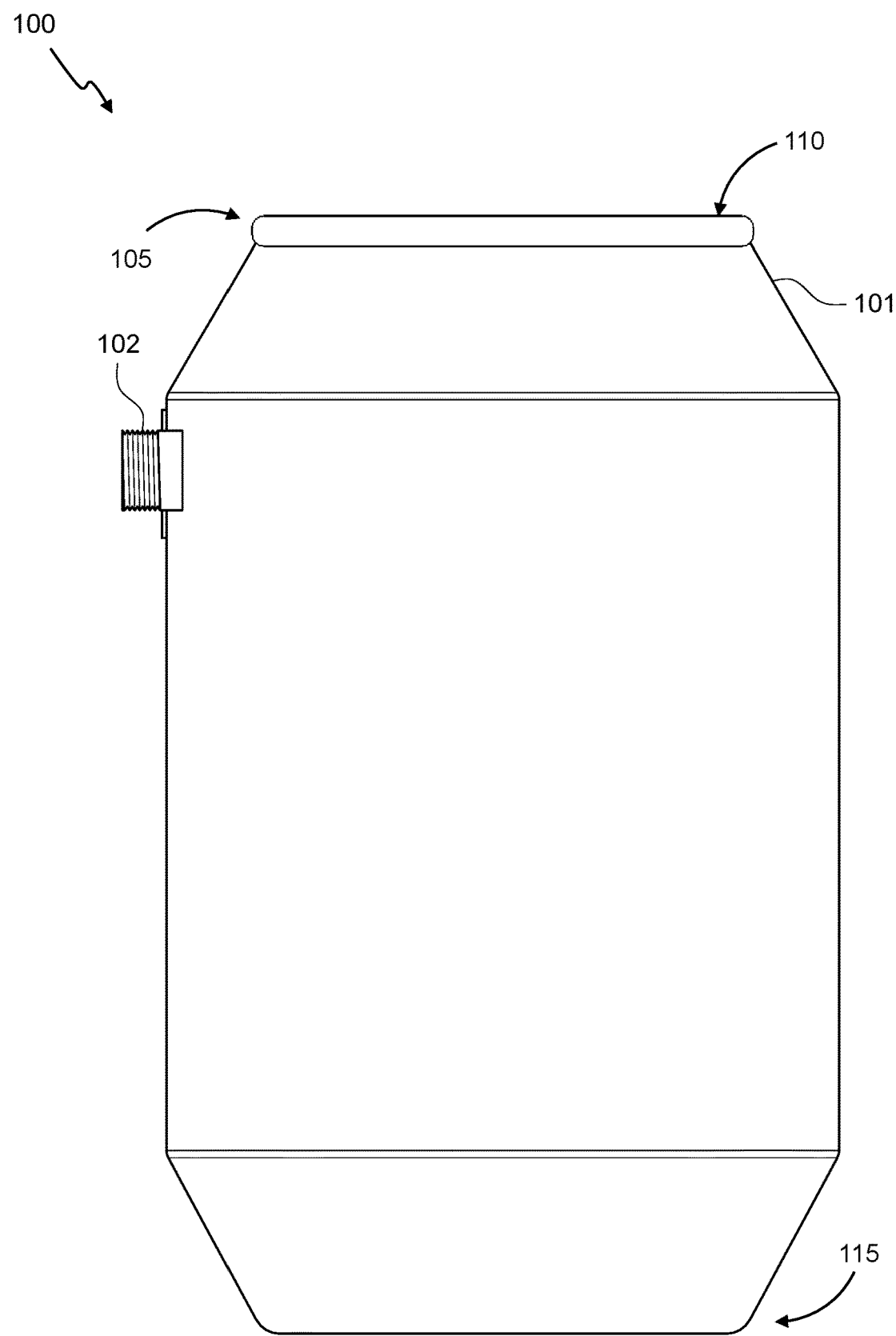
FIGS. 1a-d illustrate an example embodiment of an article of manufacture providing a water salinizer to add salt to pool water according to the present invention.

This application relates in general to an article of manufacture for providing water treatment, and more specifically, to an article of manufacture for providing a water salinizer to add salt to pool water according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps, or components, but do not preclude the presence or addition of one or more other features, steps, or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual" and "user" refer to an entity, e.g., a human, using an article of manufacture providing a water salinizer to add salt to pool water associated with the invention. The term user herein refers to one or more users.

The term "invention" or "present invention" refers to the invention being applied for via the patent application with the title "Water Salinizer." Invention may be used interchangeably with salinizer.

In general, the present disclosure relates to an article of manufacture providing a water salinizer to add salt to pool water according to the present invention. To better understand the present invention, FIGS. 1a-d illustrate an example embodiment of an article of manufacture providing a water salinizer to add salt to pool water according to the present invention. FIGS. 1 a-d show a water salinizer 100 in a process to salinize water using the article of manufacture according to the present invention. A barrel 101 is shown in FIG. 1a having a discharge port 102 coupled through a side wall of the barrel about a top edge of the barrel 101. The salinized water flows out of the discharge port 102 for use in a pool or other location.

Figure 1B:
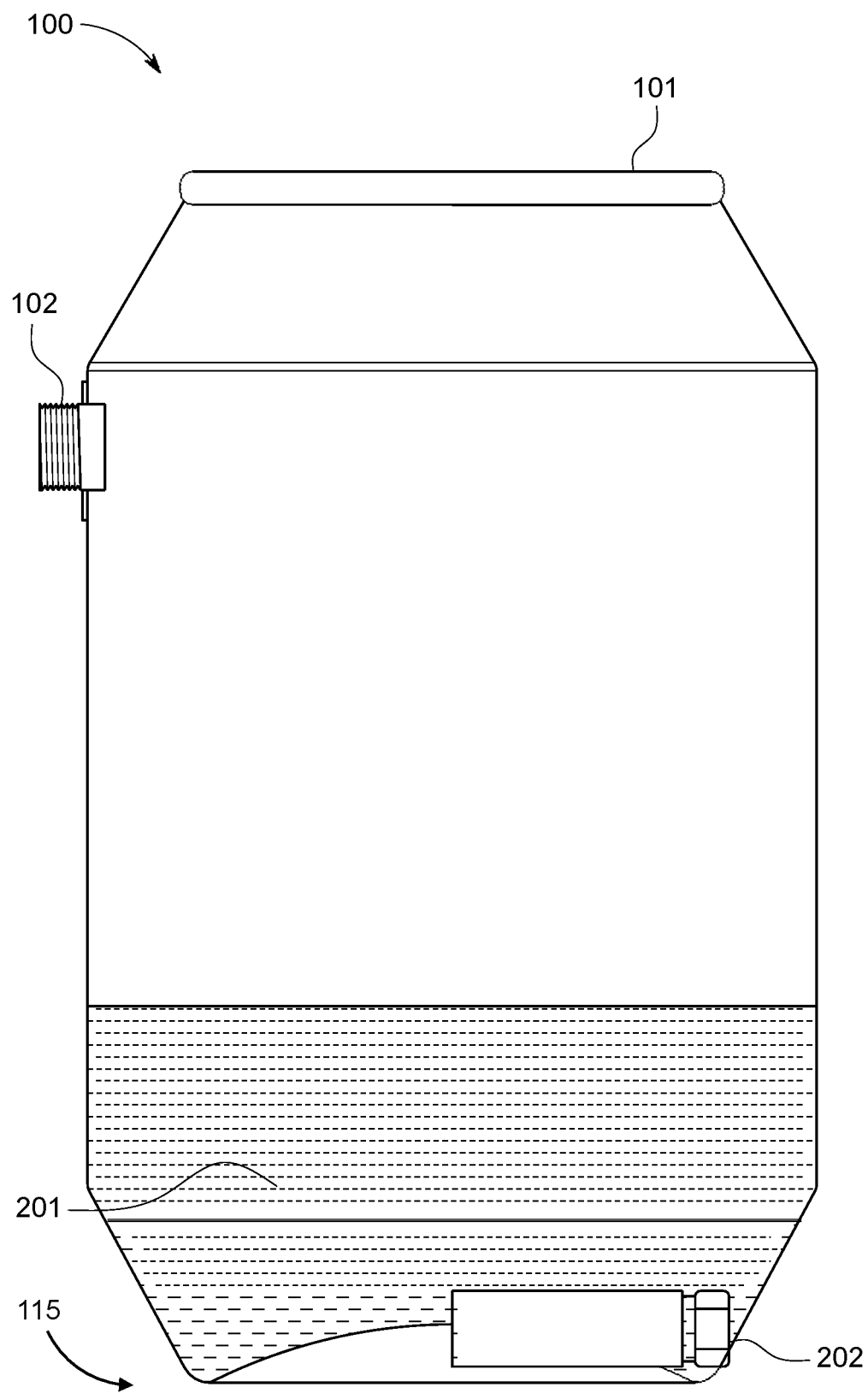

FIG. 1b shows the barrel 101 having an input port 202 located through the side wall of the barrel 101 about a bottom end 115 on an opposite side of the barrel 101 from the outflow port 102. The bottom end 115 is positioned opposite a top end 105 of the barrel 101. The barrel 101 has an opening positioned in the top end 105 that permits the addition of dissolvable material (e.g., granular pool salt 201).

Figure 1C:
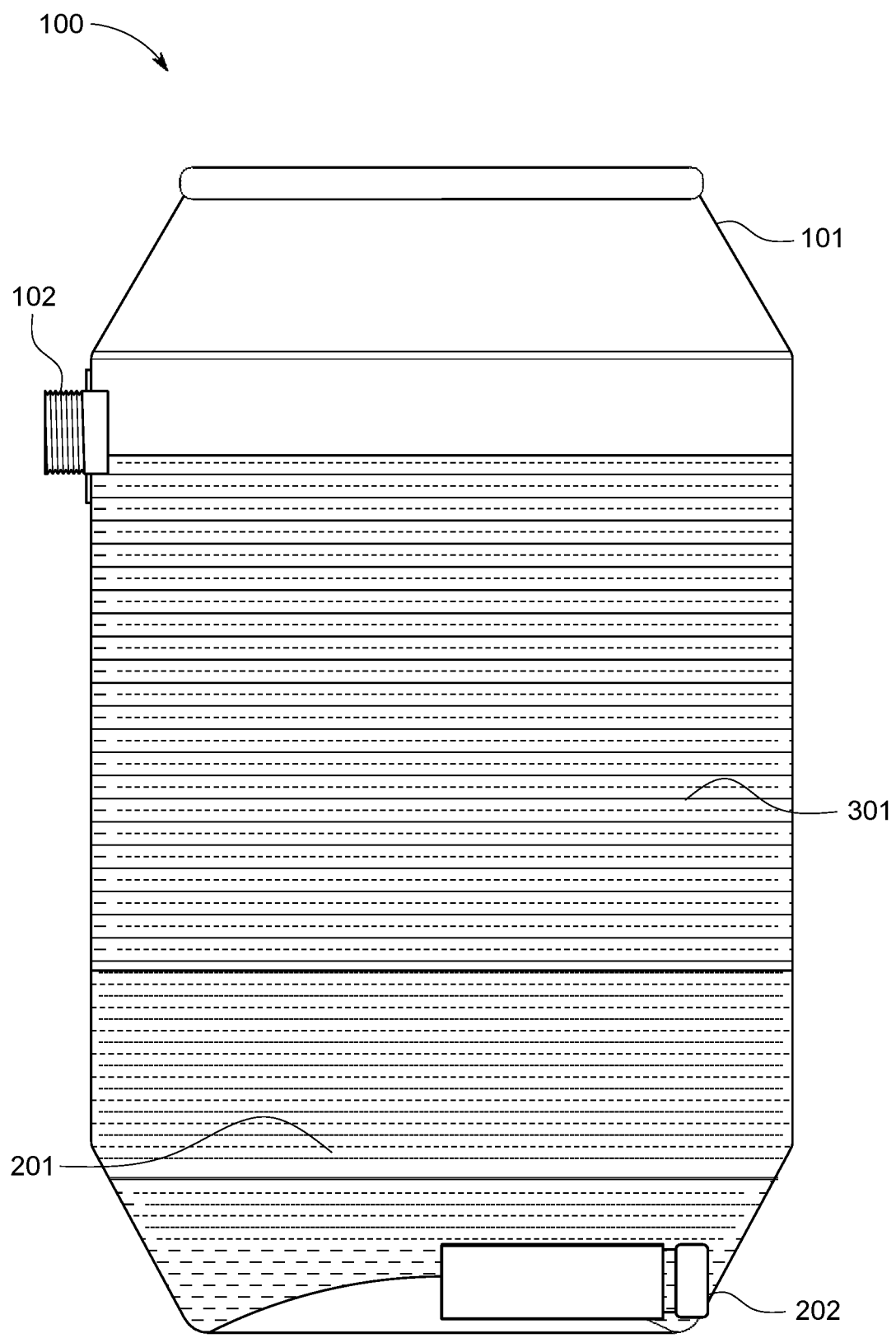
Figure 1D:
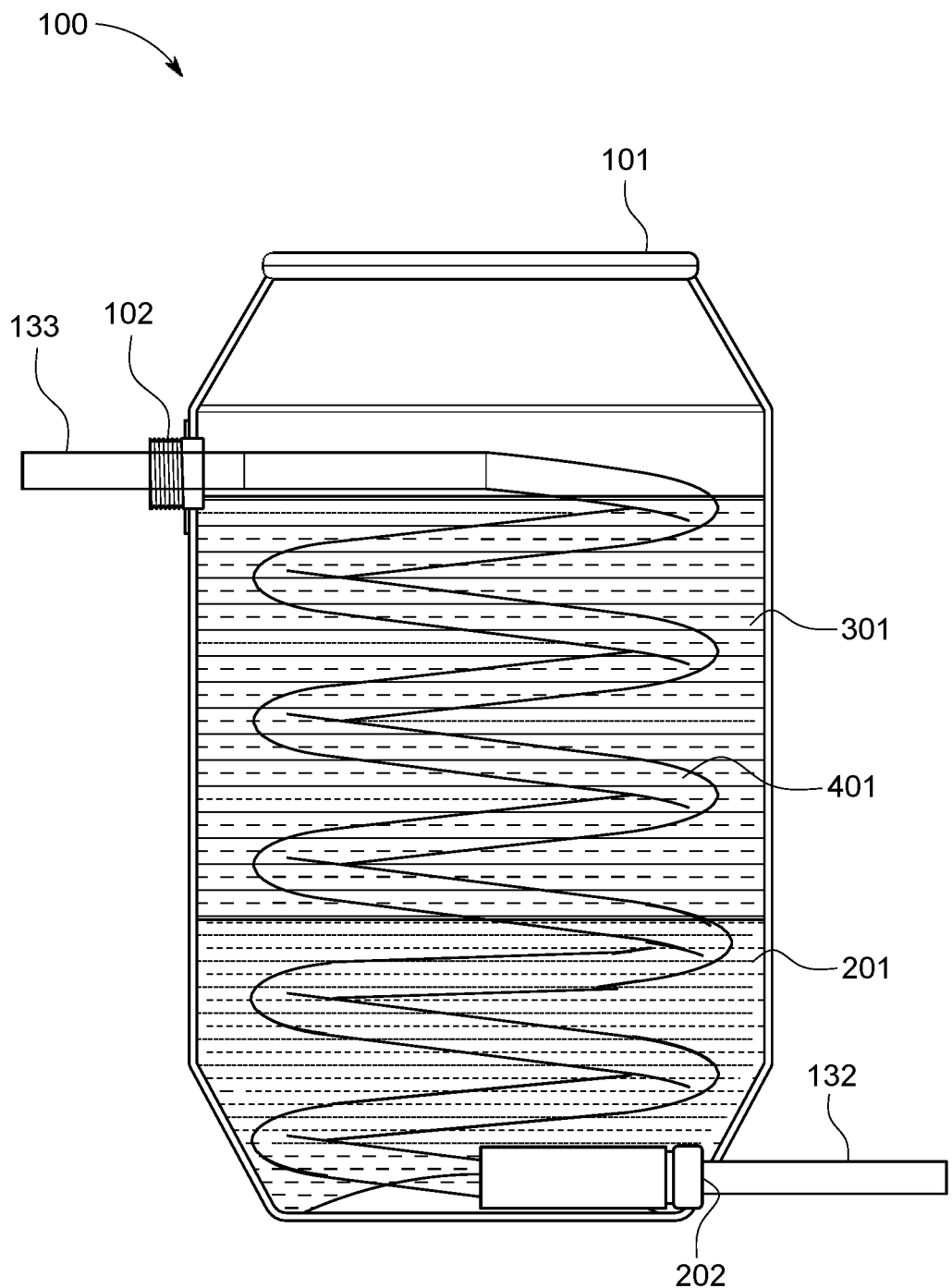
Figure 2A:
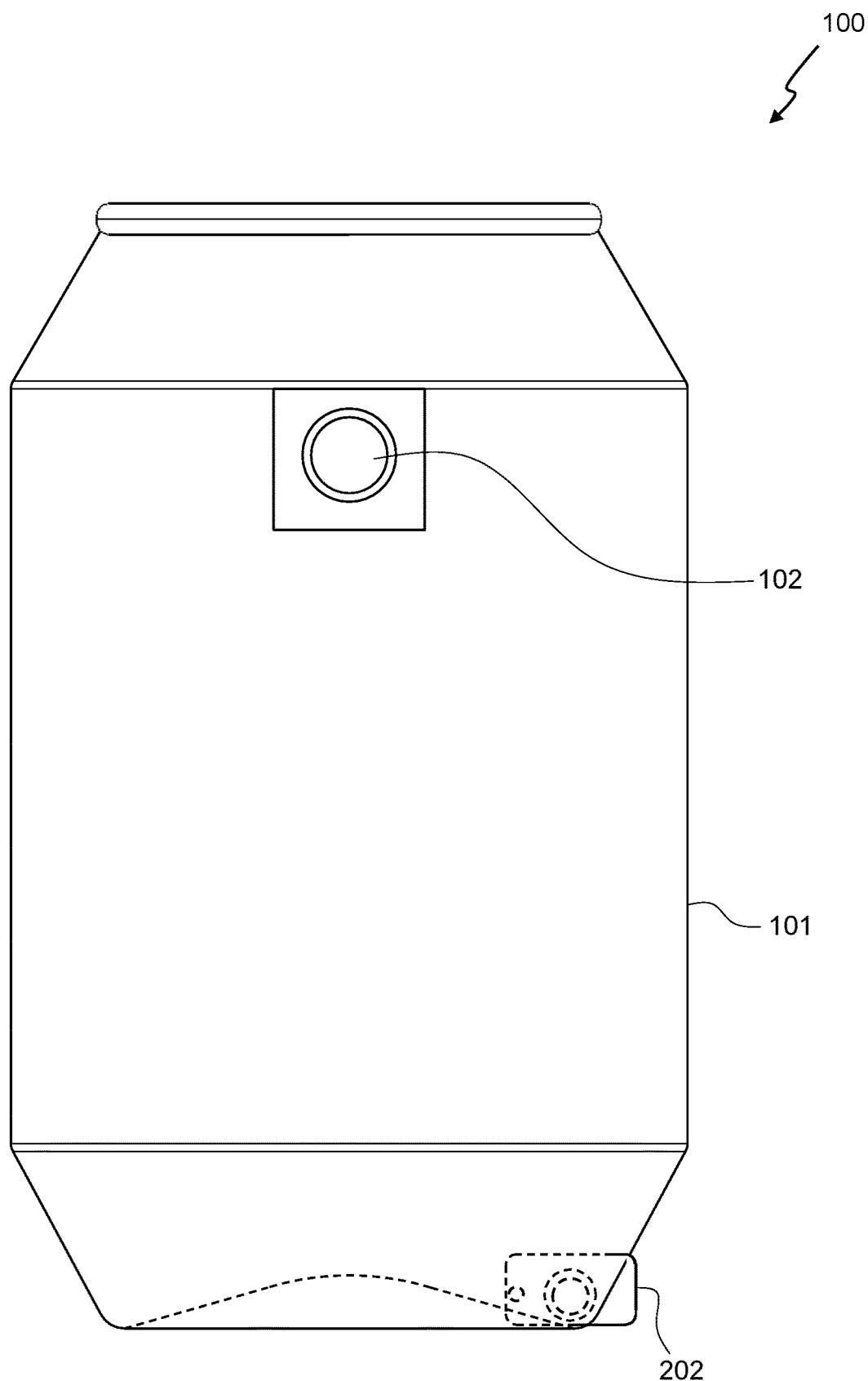
FIG. 2 illustrates multiple views of an article of manufacture providing a water salinizer to add salt to pool water according to the present invention.
Figure 2B:
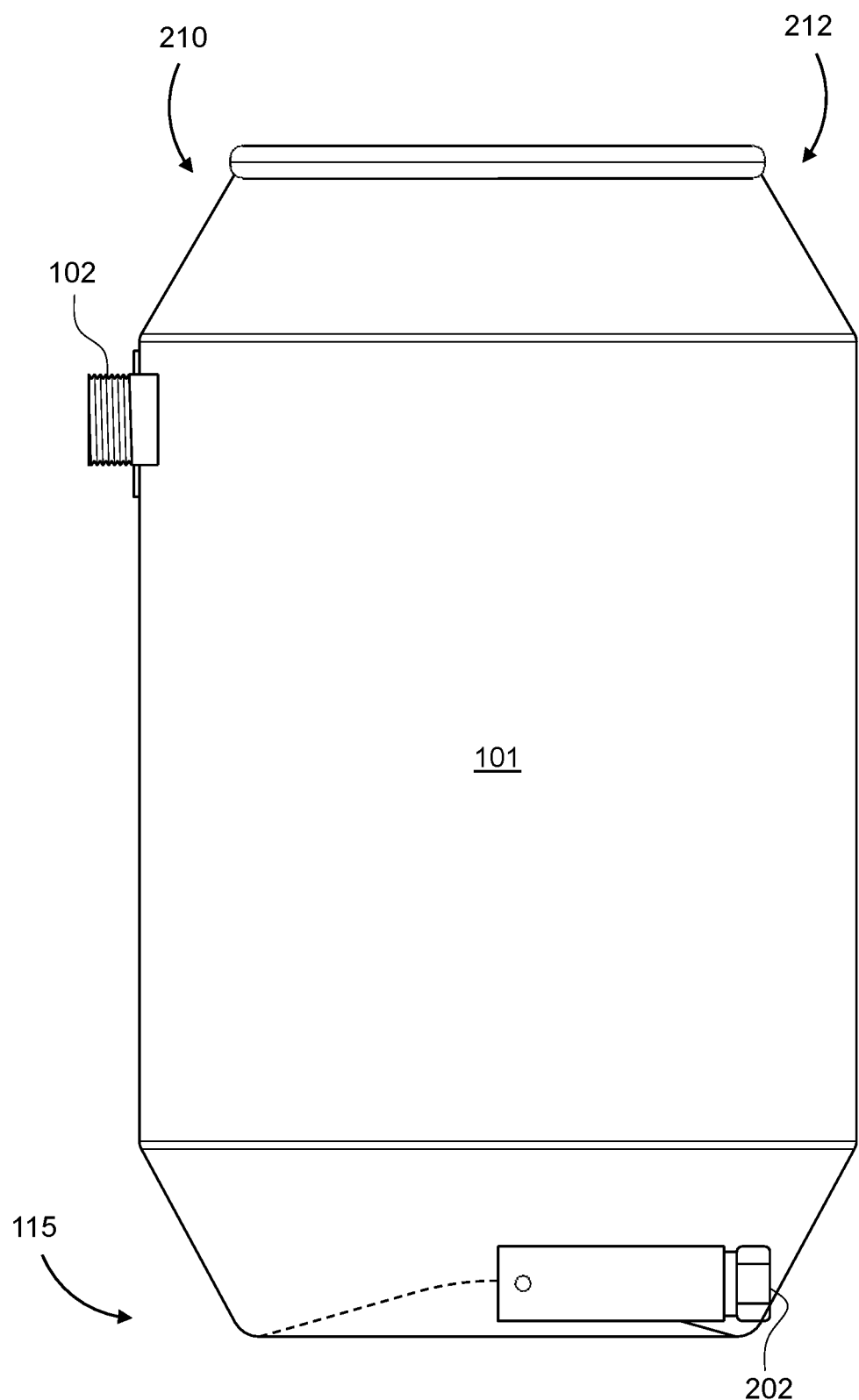
Figure 2C:
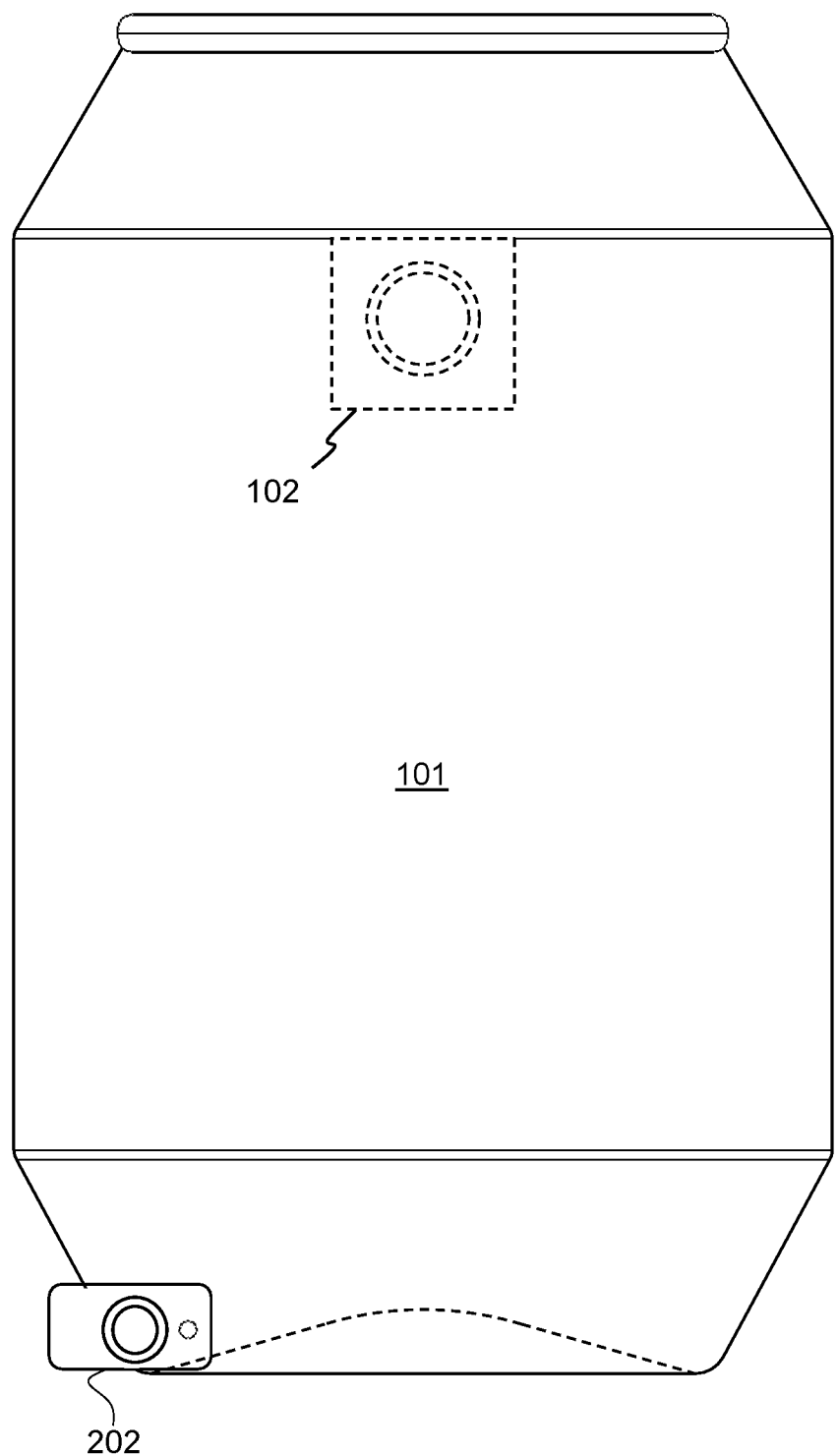
Figure 2D:
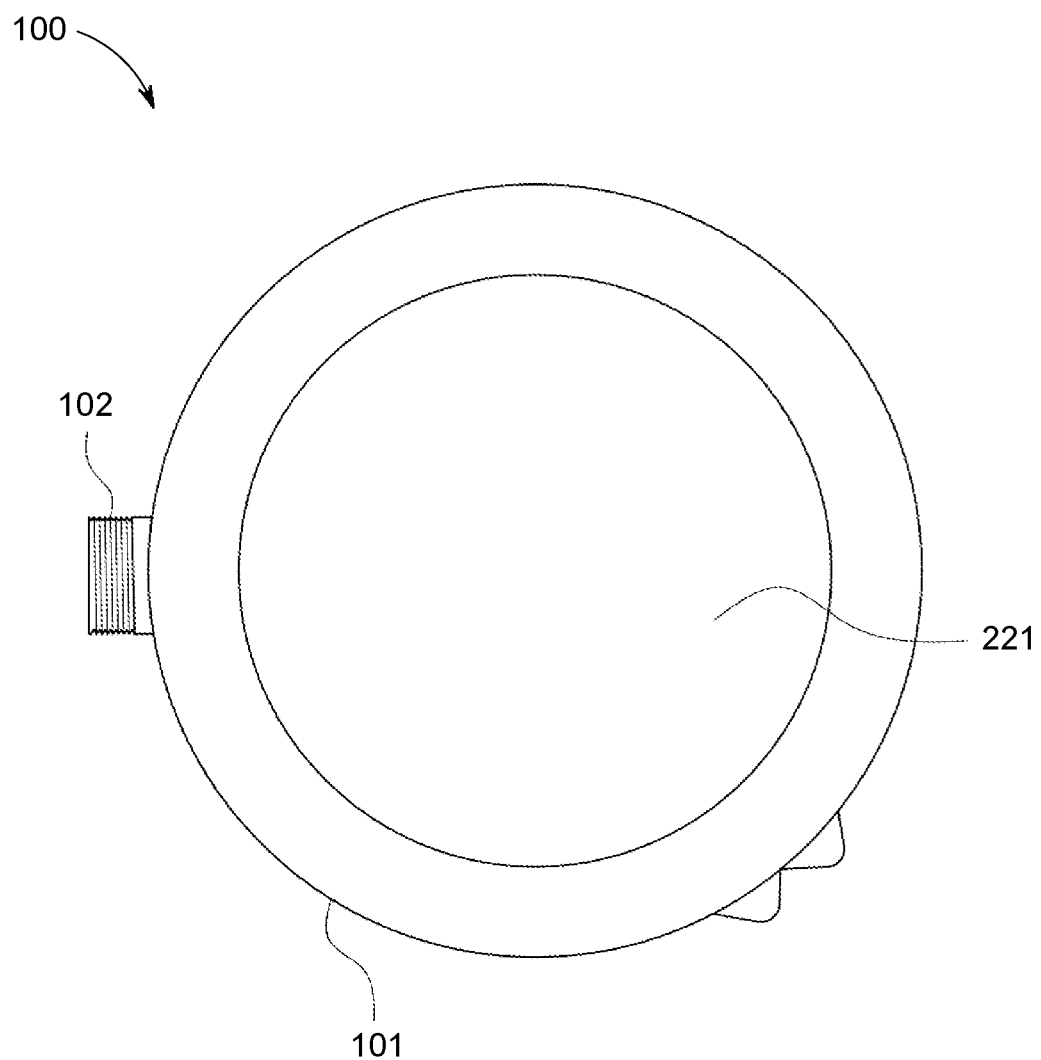
Figure 2E:
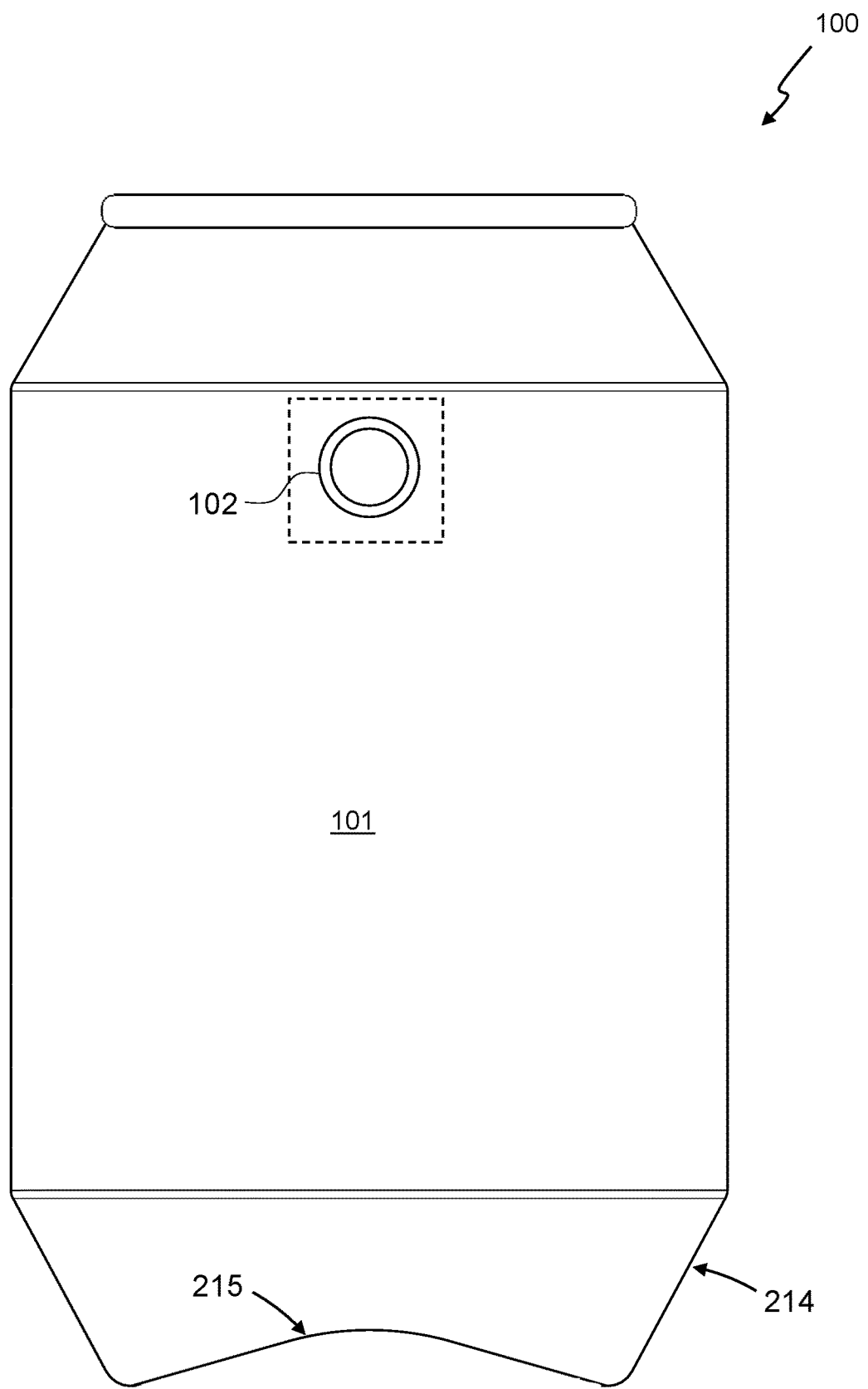

As shown in FIG. 1c, when pressurized fresh water is forced into the input port 202 of the barrel, the incoming water passes through the granular salt 201 in the barrel 101 to generate salinized water 301. When the barrel is filled with incoming pressurized fresh water, salinized water flows out of the discharge port 102. A hose (not shown) may be attached to the outflow port 102 to direct the salinized water 403 to a desired location.

Due to the location of the pressurized water inlet 202 (i.e., proximate to the bottom end 115) pressurized water (e.g., water 132) is introduced along the angled sidewall 214, which causes the water 132 to, circulate 401 through the salt in a centrifugal pattern to facilitate dissolution. As the pressurized water centrifugally flows through and dissolves the salt granules 201 salinated water 133 (i.e., a slurry) is formed and discharged through the discharge port 102 by the pressure of the incoming fresh water.

The water salinizer 100 dissolves the salt granules 201 as the water enters the input port 202, traverses the barrel 101 and discharges via the discharge port 102. For example, the salinated water can be collected into a pool or similar structure configured to hold water. A user that desires to add salt to a pool may control the quantity of salt added to the pool water by operating the water salinizer 100 for a predetermined time period to dissolve a predetermined amount of salt. Other minerals and water treatment additives may be dissolved in a similar manner using the water salinizer 100 as described herein.

FIGS. 2A-2E illustrates a left-side view, a front view, a right-side view, a top view, and a cut-through views, respectively, of the water salinizer 100, according to some embodiments of the present invention. The water salinizer 100 includes a left side 210 and a right side 212. The discharge port 102 and the pressurized water inlet 202 are shown to disclose the relative position of each to the other. The top opening 221 in the barrel 101 used to add the granular salt is shown in the top view 213. The cut-through view 213 of the barrel 101 view shows a convex bottom 215 and angled sidewall 214. The convex bottom 215 and angled sidewall 214 of the water salinizer 100 significantly aids the incoming water flow as it circulates through the barrel 101 to dissolve the granular salt. The slope of the convex bottom 215 is configured to direct granular material (e.g., granular salt) into the path of water that flows from the water inlet 202. In the same vein, the slope of the angled sidewall 214 is configured to direct the granular material into the path of water that flows from the water inlet 202.

In a preferred embodiment, the barrel 101 is an 8-gallon drum. The inflow port 202 comprises a 0.750-inch inlet housing 400, shown in detail in FIG. 4, and a 0.750-inch female garden hose fitting 300 shown in detail in FIG. 4. The discharge port 102 comprises a standard 1.50 inch male hose fitting, as shown in FIG. 3, to allow a hose to direct the salinized water to a desired location. The bottom surface of the barrel 101 comprises an upward convex surface and an angled sidewall of the barrel 101 attached to the bottom to assist to direct the granular salt 201 into the path of the pressurized fresh water 132 as it circulates upward.

Figure 3A:
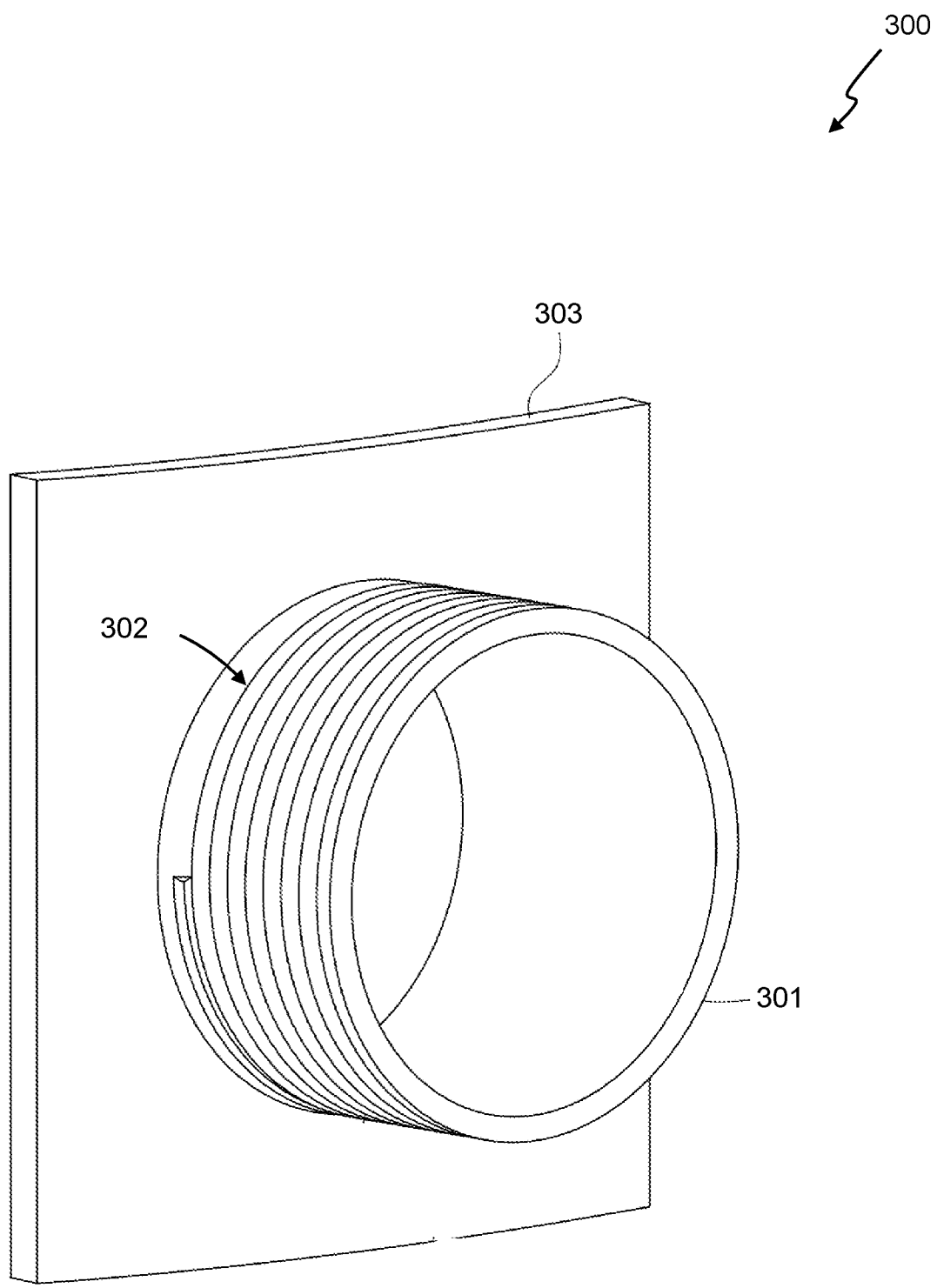
FIGS. 3a-c illustrate multiple views of a discharge port fitting in an article of manufacture providing a water salinizer to add salt to pool water according to the present invention.
Figure 3B:
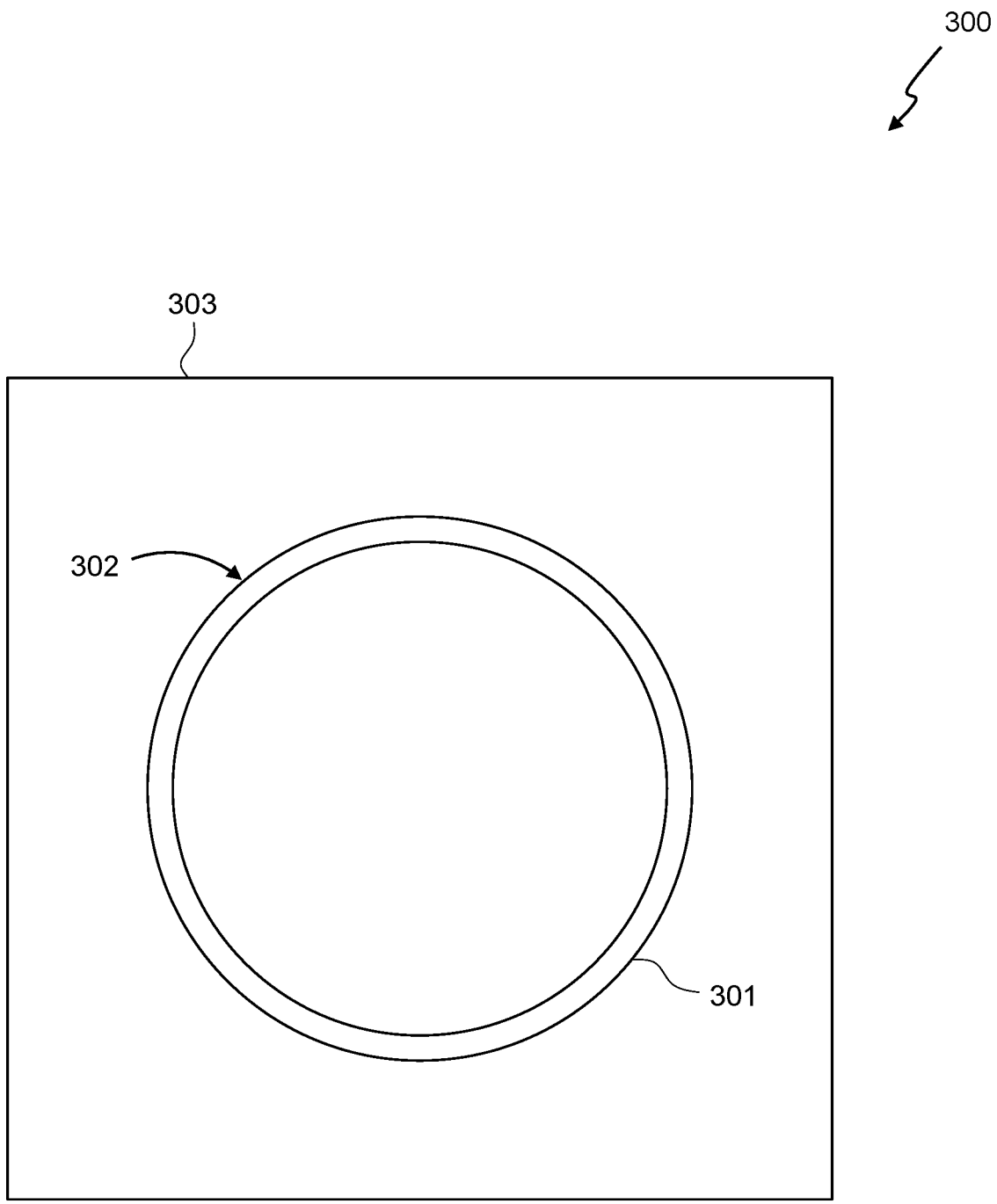
Figure 3C:
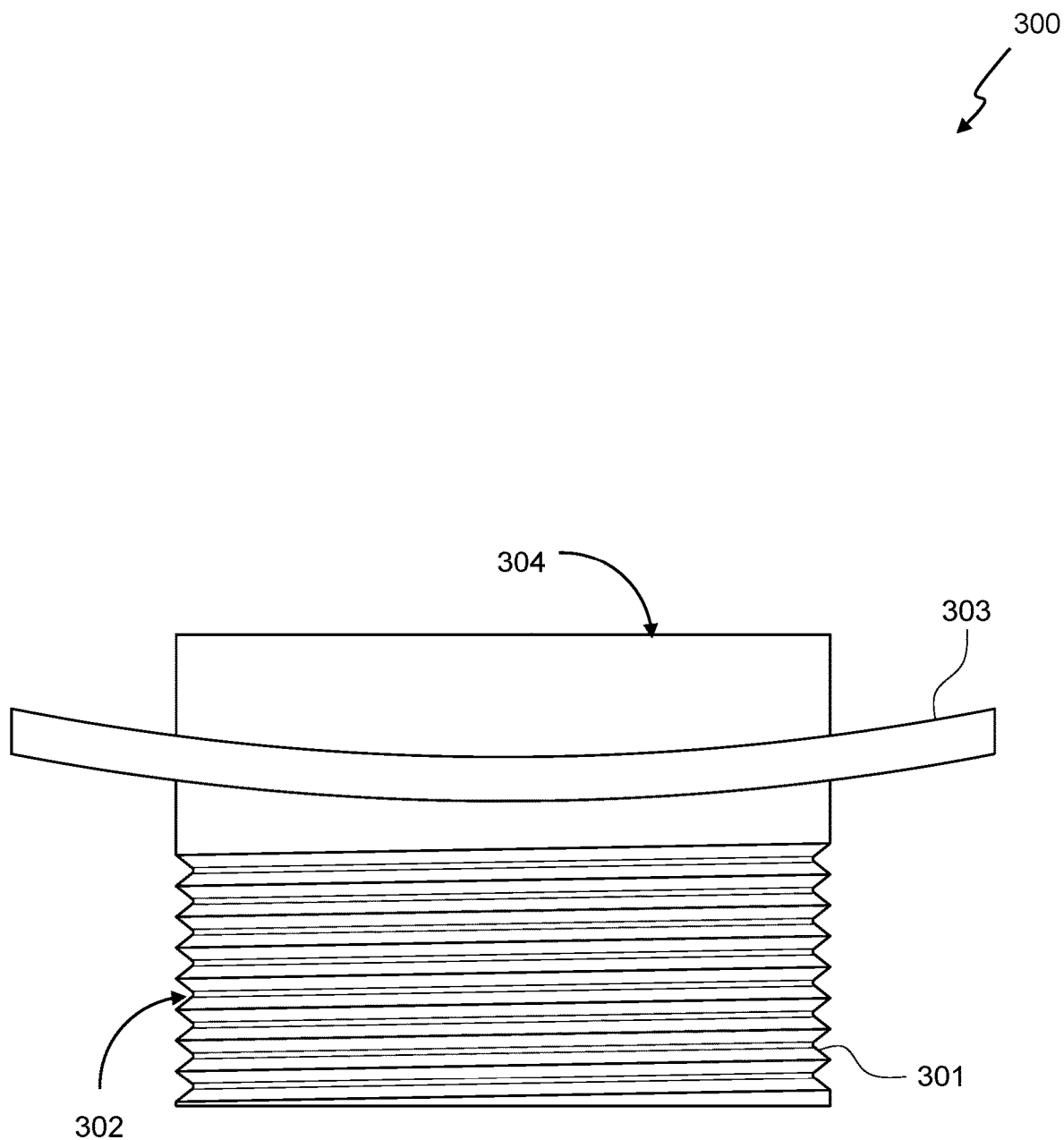

FIGS. 3A-3C illustrate a perspective view, a front view, and a top view of a discharge port fitting, generally 300, of the water salinizer 100, according to other embodiments. The discharge port fitting 300 includes a wall-mating surface panel 303 and a discharge channel 301 positioned to extend through the wall mating surface panel 303. The slurry (e.g., the salinized water) that is formed within the barrel 101 is discharged via the discharge channel 301. The discharge channel includes a threaded region 302 externally positioned opposite an inner barrel port region 304. The threaded region 302 includes threads (or other fasteners) to demountably receive a hose. The threaded region 302 is externally positioned on the barrel 101. The inner barrel port region 304 is internally positioned on the barrel 101. The wall-mating surface 303 is curved to match the radius of the barrel 101. The threaded region 302 is sized to match a hose to be used to direct the salinized water to its destination. The inner barrel port region 304 passes through the barrel 101 sidewall to access the salinized water in the barrel 101. The discharge port fitting 300 may be coupled through the barrel 101 using PVC glue or similar adhesive between the barrel walls and the wall-mating surface 303.

Figure 4A:
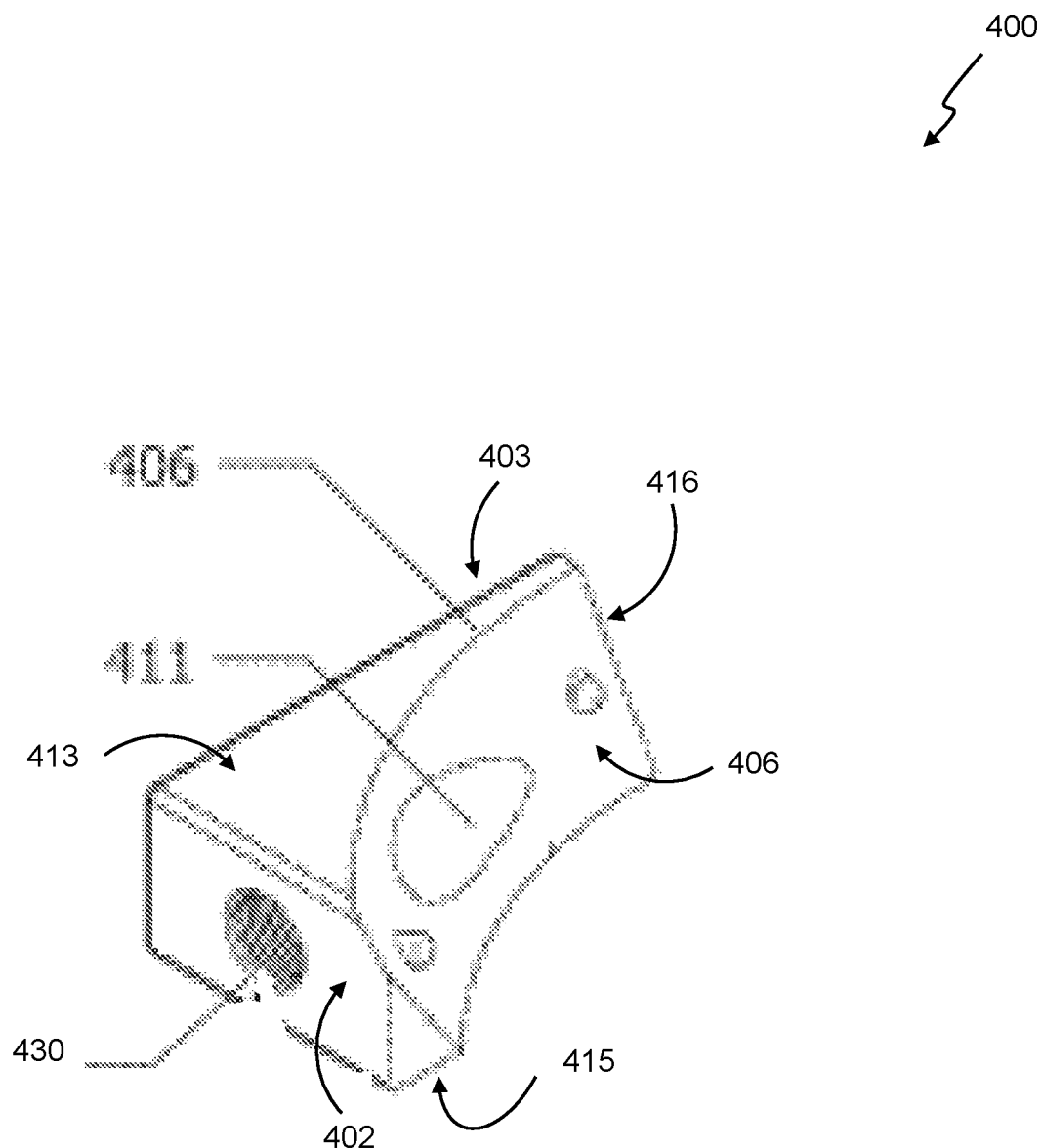
FIG. 4 illustrates multiple views of an intake directional port of an article of manufacture providing a water salinizer to add salt to pool water according to the present invention.
Figure 4B:
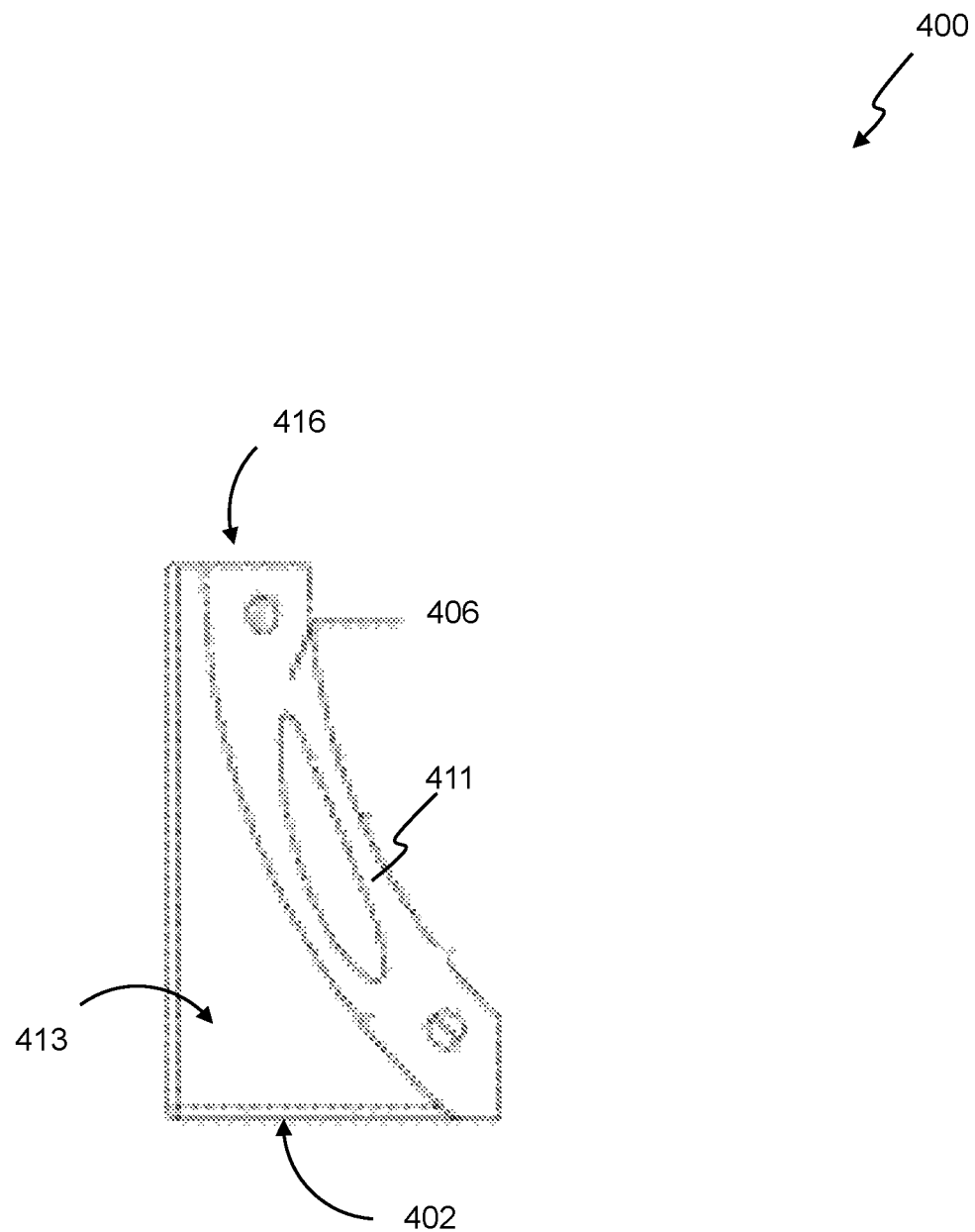
Figure 4C:
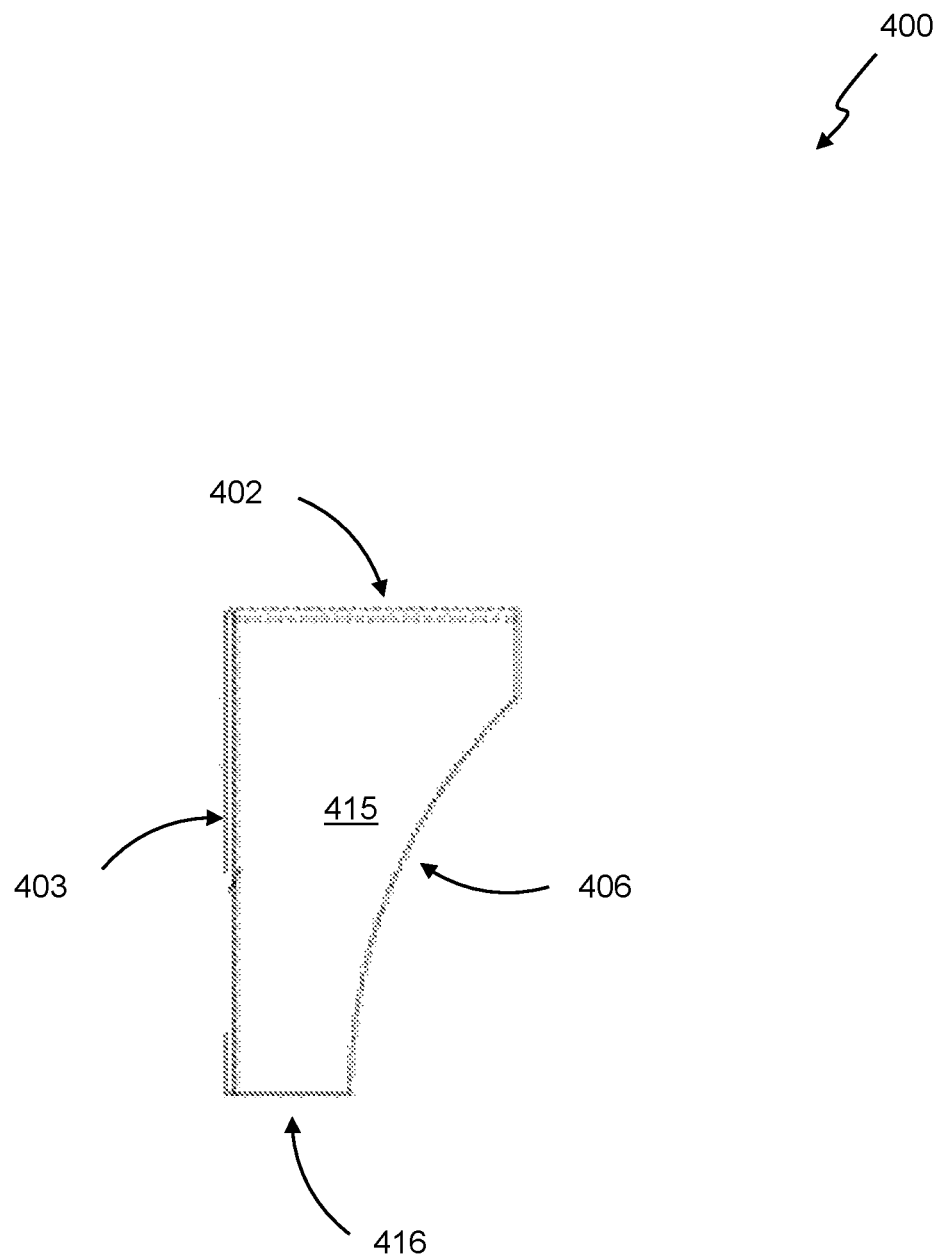
Figure 4D:
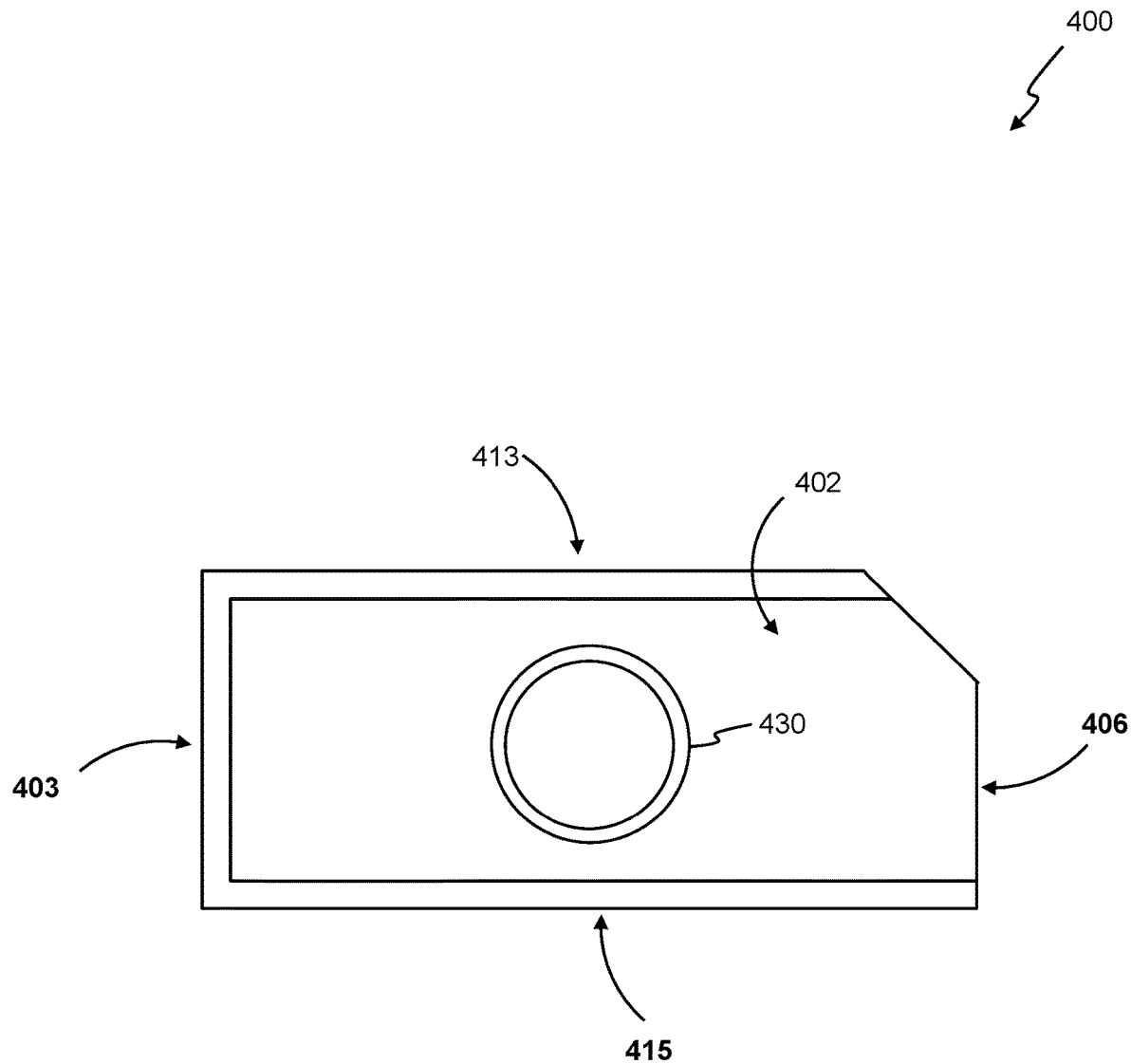

FIG. 4A illustrates a perspective view of an intake directional port, generally 400, according to some embodiments. Preferably, the input port 202 is in the form of the intake directional port 400. The intake directional port 400 is an apparatus that is externally affixed to the barrel 101 in a manner to direct the flow of water (or other solution) that enters the barrel 101 to facilitate a centrifugal motion of the water within the barrel 101. The intake directional port 400 is externally affixed to the angled sidewall 214. The intake directional port 400 includes a top surface 413, a bottom surface 415, a first end 402, a second end 416, a first sidewall 403, and a second side wall 406. FIGS. 4B-4D illustrate a top view, a bottom view, and a left side view (and View B), respectively, of the intake directional port 400, according to certain embodiments. The first end 402 is preferentially positioned parallel to the second end 416. Although the height of the first end 402 is the same as that of the second end 416, the first end 402 is wider than the second end 416. The overall length of the first wall 403 is the same as that of the second wall 406. The first side wall 403 is preferably oriented parallel to the first end 402 and the second end 416. Each of the first side wall 403, the first end 402, and the second end 416 are preferably oriented parallel to both the top surface 413 and the bottom surface 415. The top surface 413 and the bottom surface 415 are preferably oriented parallel to each other. The overall width of the bottom surface 415 is wider than that of the top surface 413 such that the second sidewall 406 is angularly oriented relative to both the top surface 413 and the bottom surface 415 (see FIGS. 4A-4C). The second sidewall 406 curves as it extends from the second end 416 to the wider first end 402 (see FIGS. 4A-4C) to accommodate the overall angle the angled sidewall 214 (i.e., to accommodate the radius of curvature of the sidewall 214). In other words, the radius of curvature of both the second sidewall 406 and the angled sidewall 214 are preferably the same.

Figure 4E:
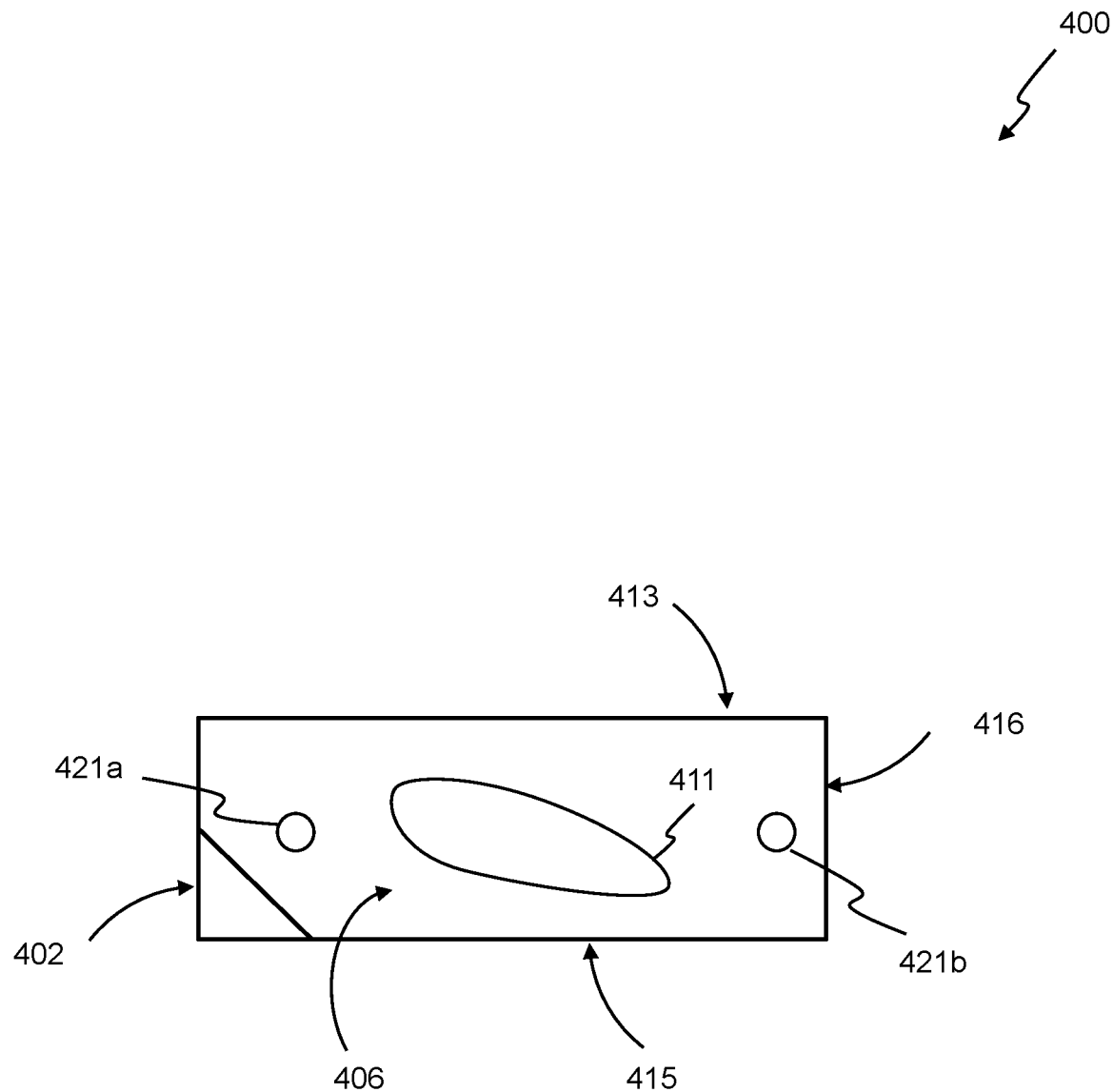
Figure 4F:
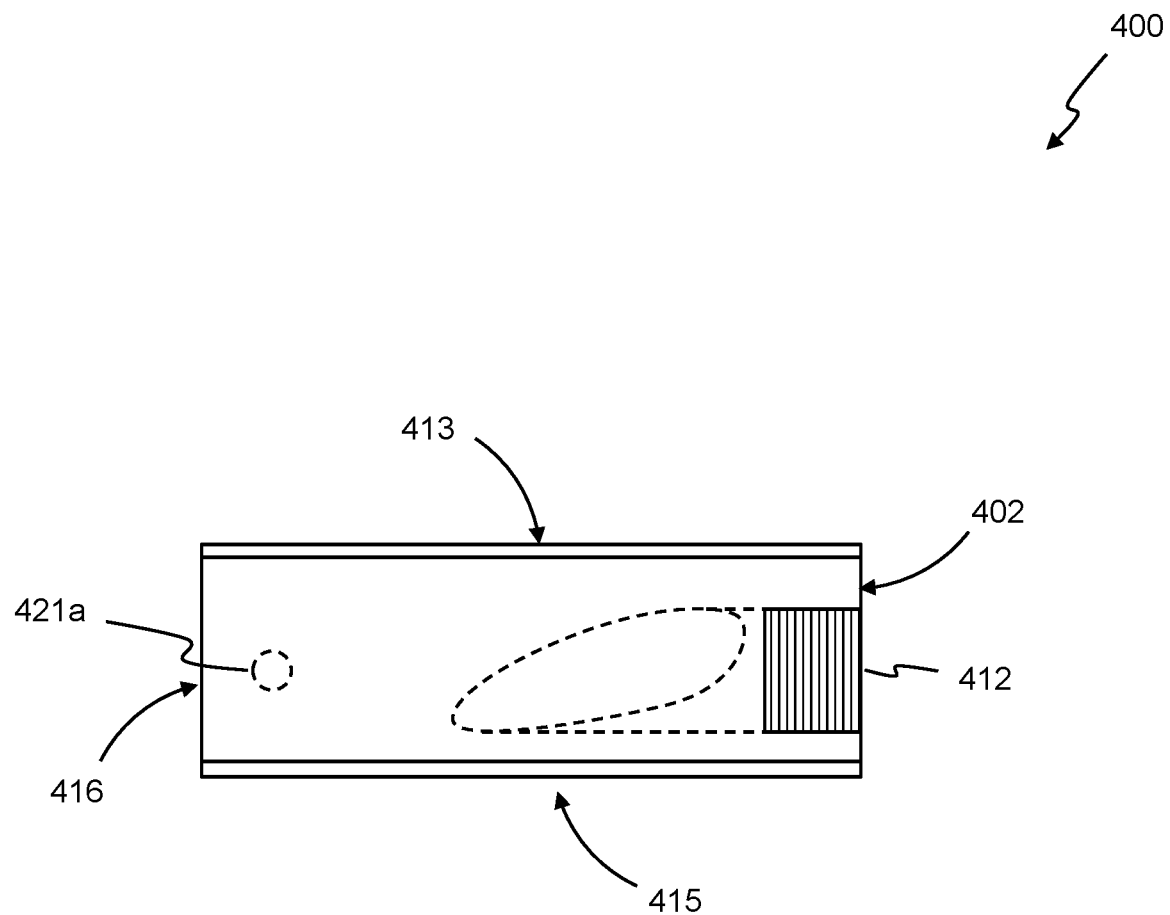

FIG. 4E depicts a front view of the intake directional port 400, according to other embodiments. A directional port 411 is axially aligned within the intake directional port 400. FIG. 4F depicts a cut-through view (View B of FIG. 4C) of the intake directional port 400, according to yet still other embodiments. The directional port 411 is aligned with an opening in the barrel 101 and functions as a conduit to introduce materials (i.e., solutions) into the barrel 101. The directional port 411 is tangentially aligned with the angled sidewall 214. The directional port 411 includes a channel 414 positioned adjacent to a threads 430 that functions as a connector (e.g., a connector known in the arts) to receive a hose of similar conduit. The threads 430 is a threaded orifice extends to and is accessible via the first end 403. For example, when a water hose is connected to the directional port 411 via the threads 430, the channel 414 directs water between the convexed bottom 215 and the angled sidewall 214 to thereby promote a centrifugal motion of the water within the barrel 101. This curved shape directs the pressurized fresh water to circulate about the barrel along the sidewall as the water flows through the granular salt. In certain embodiments, the top surface is sloped downward having a radius of 4.52 inches along the barrel sidewall side 403 and a radius of 5.27 inches the inner barrel side 406. The intake directional port 400 is externally secured to the sidewall of the barrel using PVC glue or similar adhesive in the preferred embodiment. Locator projections (e.g., locator projections 421a and 421b) are little nubs that laterally extend from the second sidewall and are oriented orthogonal to the first sidewall 403. The locator projections align exactly with dimples or indentions that laterally extend from the angled sidewall 214 for perfect alignment for affixing with PVC glue.

The ¾" (0.75") threads 412 start out straight into the block but with the shape turning into and angular/radius/form, now it is exiting in an angular fashion to mate with the curvature of the barrel 101. The same angular exiting shape with be drilled through the side angle of the barrel 101 but does not need to be threaded as the only threads 412 needed are in the inlet assembly 400 to screw in a ¾"garden hose fitting.

Figure 5:
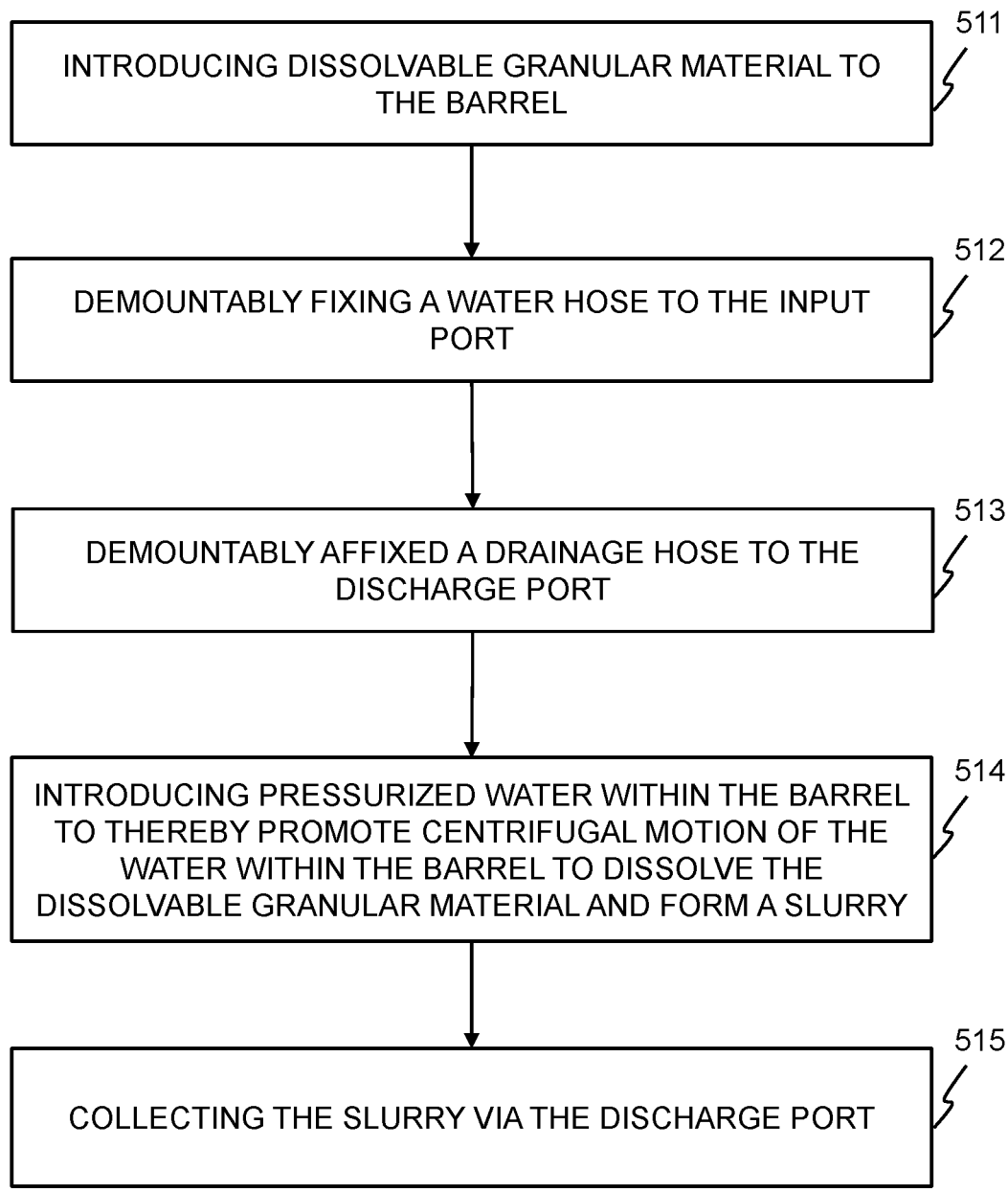
FIG. 5 illustrates a flowchart of a method to salinize water using an article of manufacture providing a water salinizer to add salt to pool water according to the present invention.

FIG. 5 illustrates a flowchart of a method to salinize water using the water salinizer 100, according to some embodiments. At Step 511, dissolvable granular material (e.g., granular salt) is introduced to the barrel 101 via the opening 110. At Step 512, a water hose is demountably affixed to the input port 202. At Step 513, a drainage hose is demountably affixed to the discharge port 102. The drainage hose directs the discharge of water salinizer 100 to a repository (e.g., a pool or other liquid storage structure). At Step 514, pressurized water is introduced to the barrel 101 via the input port 202 in a manner to promote centrifugal motion of the introduced water within the barrel 101 to dissolve the dissolvable granular material and thereby form a slurry (e.g., salinated water). At Step 515, the slurry is collected via the discharge port 102.

Once configured, fresh water is introduced through the pressurized water inlet 202 into the barrel 101 about its bottom surface in step 514. The barrel 101 fills with a slurry (i.e., water that has passed through the granular salt added to the barrel in step 511) thereby causing the slurry (salinized water) to flow out of the discharge port 300 when the slurry rises thereto.

Test step 516 determines whether the salt granules have dissolved within the barrel, and if not, the process 500 returns to step 514 to continue to add fresh water to the barrel 101. When all of the test step 516 determines that all of the salt granules have been dissolved, the process 500 ends 502.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A water salinizer comprising:
   a barrel comprising:
      a top end;
      a bottom end positioned opposite the top end;
      a cylindrical sidewall;
      a convex bottom positioned proximate to the bottom end and comprising an apex that extends towards the top end;
      an angled sidewall positioned between the convex bottom and the cylindrical side wall;
      an opening positioned proximate to the top end;
   an input port configured to be coupled to a water source and externally coupled to the angled sidewall proximate to the bottom end in a manner to direct incoming water between the convexed bottom and the angled side wall; and
   a discharge port coupled to the cylindrical sidewall proximate to the top end;
   wherein
      the barrel receives dissolvable material via the opening;
      the dissolvable material collects between the convex bottom and the angled sidewall;
      the input port is configured to be demountably affixed to a water source;
      the input port positions incoming water between the convex bottom and the angled sidewall to thereby cause incoming water to centrifugally traverse the granular material and form a slurry; and
      the slurry exits the barrel when the slurry rises to the discharge port.

2. The water salinizer of claim 1, wherein
   the input port is in the form of an intake directional port comprising:
      a top surface;
      a bottom surface;
      a first end;
      a second end;
      a first sidewall;
      a second side wall;
   wherein
      the bottom surface is wider than that of the top surface such that the second sidewall is angularly oriented relative to both the top surface and the bottom surface.

3. The water salinizer of claim 2, wherein
   the intake directional port comprises a directional port axially aligned within the intake directional port;
   the directional port comprises a channel positioned adjacent to threads;
   the threads are accessible via the first end and configured to demountably receive a hose;
   the channel directs water between the convexed bottom and the angled sidewall to thereby facilitate incoming water to centrifugally traverse the granular material and form the slurry.

4. The water salinizer of claim 3, wherein
   the first end is wider than the second end; and
   the second sidewall curves as it extends from the second end to the first end to accommodate the angled sidewall.

5. The water salinizer of claim 4, wherein
   the first end is positioned parallel to the second end; and
   the first end 402 and the second end are similar in height.

6. The water salinizer of claim 5, wherein
   the directional port is tangentially aligned with the angled sidewall.

7. A method to form a slurry, comprising:
   adding dissolvable material to an opening of the water salinizer of claim 1;
   affixing a water source to the input port;
   affixing a hose to the discharge port;
   adding pressurized water to the water salinizer via the input port to dissolve the dissolvable material and thereby form a slurry; and
   collecting the slurry via the discharge port.

* * * * *